US012205496B1

(12) United States Patent
Solomon

(10) Patent No.: US 12,205,496 B1
(45) Date of Patent: Jan. 21, 2025

(54) WIRE LABELING KIT

(71) Applicant: Terry Solomon, Austin, TX (US)

(72) Inventor: Terry Solomon, Austin, TX (US)

( * ) Notice: Subject to any disclaimer, the term of this patent is extended or adjusted under 35 U.S.C. 154(b) by 151 days.

(21) Appl. No.: 18/115,473

(22) Filed: Feb. 28, 2023

Related U.S. Application Data

(60) Provisional application No. 63/314,891, filed on Feb. 28, 2022.

(51) Int. Cl.
*G09F 3/20* (2006.01)

(52) U.S. Cl.
CPC .................................... *G09F 3/205* (2013.01)

(58) Field of Classification Search
CPC ........................................................ G09F 3/205
See application file for complete search history.

(56) References Cited

U.S. PATENT DOCUMENTS

2004/0035029 A1* 2/2004 Forsberg ................. G09F 3/205 40/316
2010/0307039 A1* 12/2010 Weineke ................. G09F 3/205 40/316
2011/0005110 A1* 1/2011 Wieneke ................... G09F 3/06 40/316
2013/0263482 A1* 10/2013 Strater ..................... G09F 3/201 40/316
2015/0262515 A1* 9/2015 Leonardis ............... G09F 3/205 29/463
2016/0078984 A1* 3/2016 Wieneke ................... G09F 3/06 174/112
2016/0196771 A1* 7/2016 Poelker ................... G09F 3/205 40/316
2017/0110035 A1* 4/2017 Weglarz ................ G09F 3/0295
2021/0241659 A1* 8/2021 Budzak ................ F16M 13/022
2022/0139269 A1* 5/2022 Pölker ........................ G09F 3/16 40/299.01
2023/0162625 A1* 5/2023 Wölfl et al. ............. G09F 3/205 40/316
2023/0167924 A1* 6/2023 Takahashi ............... F16L 11/06 138/118

* cited by examiner

*Primary Examiner* — Gary C Hoge
(74) *Attorney, Agent, or Firm* — Plager Schack LLP; Mark H. Plager, Esq.; Michael J. O'Brien, Esq.

(57) ABSTRACT

A wire labeling kit is configured to provide functional and ownership information for a wire. The wire labeling kit has a top body further comprising a top body top side and a top body bottom side. A text field surface is arranged on the top body top side. A notched cavity is formed onto the top body bottom side. A bottom body further has a plurality of bottom protrusions which mate with the notched cavity. The top body is detachably coupled to the bottom body around the wire such that a wire label can be placed on the text field surface.

2 Claims, 3 Drawing Sheets

WIRE LABELING KIT

RELATED APPLICATION

This application claims priority to provisional patent application U.S. Ser. No. 63/314,891 filed on Feb. 28, 2022, the entire contents of which is herein incorporated by reference.

BACKGROUND

The embodiments herein relate generally to electrical engineering.

Prior to embodiments of the disclosed invention, cables were confusing regarding function and ownership. Labeling devices only worked on certain cable diameters and did not attach as conveniently or stay in place to create a positive consumer experience.

SUMMARY

A wire labeling kit is configured to provide functional and ownership information for a wire. The wire labeling kit has a top body further comprising a top body top side and a top body bottom side. A text field surface is arranged on the top body top side. A notched cavity is formed onto the top body bottom side. A bottom body further has a plurality of bottom protrusions which mate with the notched cavity. The top body is detachably coupled to the bottom body around the wire such that a wire label can be placed on the text field surface.

A first top protrusion and a second top protrusion are formed within the notched cavity. A bottom body cavity is formed though the bottom body and houses an internal magnet.

BRIEF DESCRIPTION OF THE FIGURES

The detailed description of some embodiments of the invention is made below with reference to the accompanying figures, wherein like numerals represent corresponding parts of the figures.

DETAILED DESCRIPTION OF CERTAIN EMBODIMENTS

Figure 1:
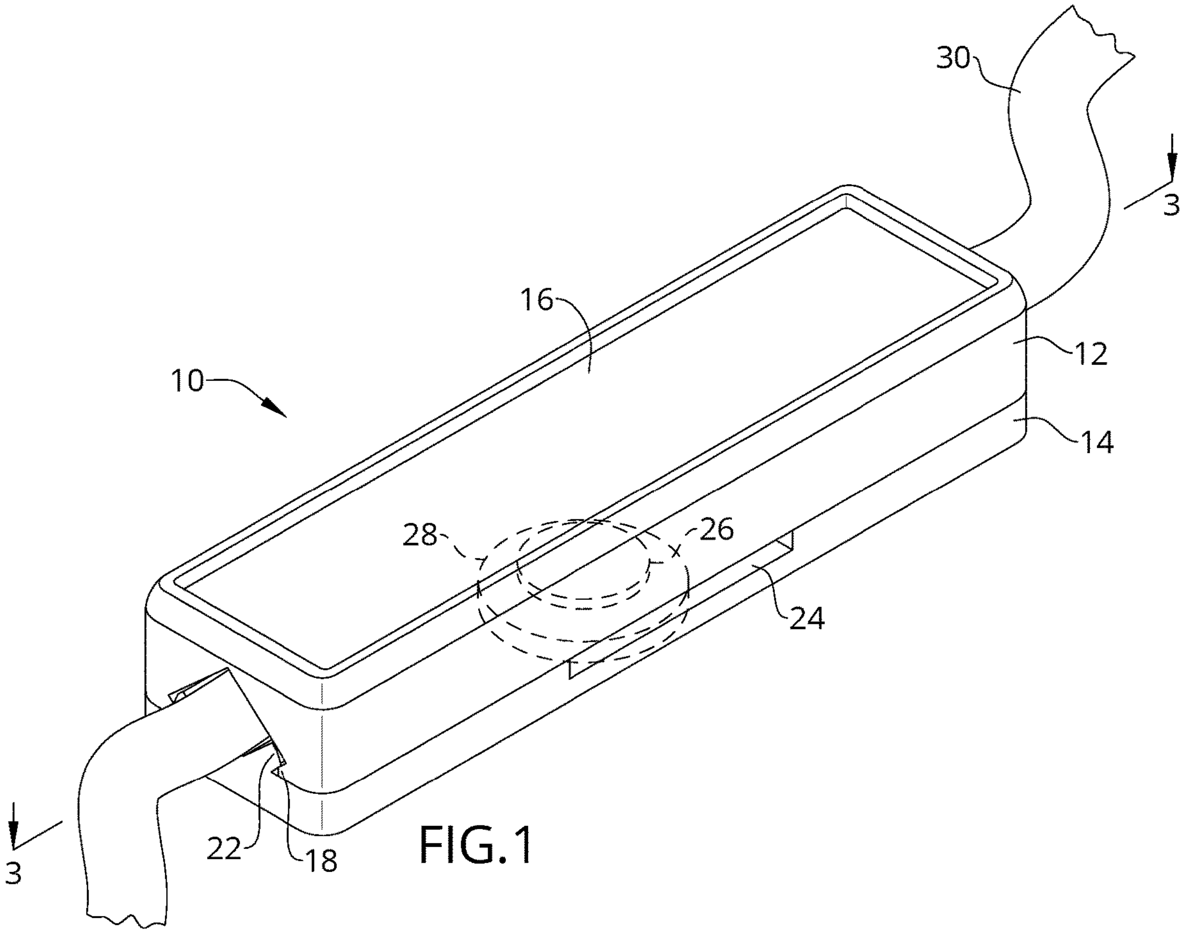
FIG. 1 shows a perspective view of one embodiment of the present invention.
Figure 2:
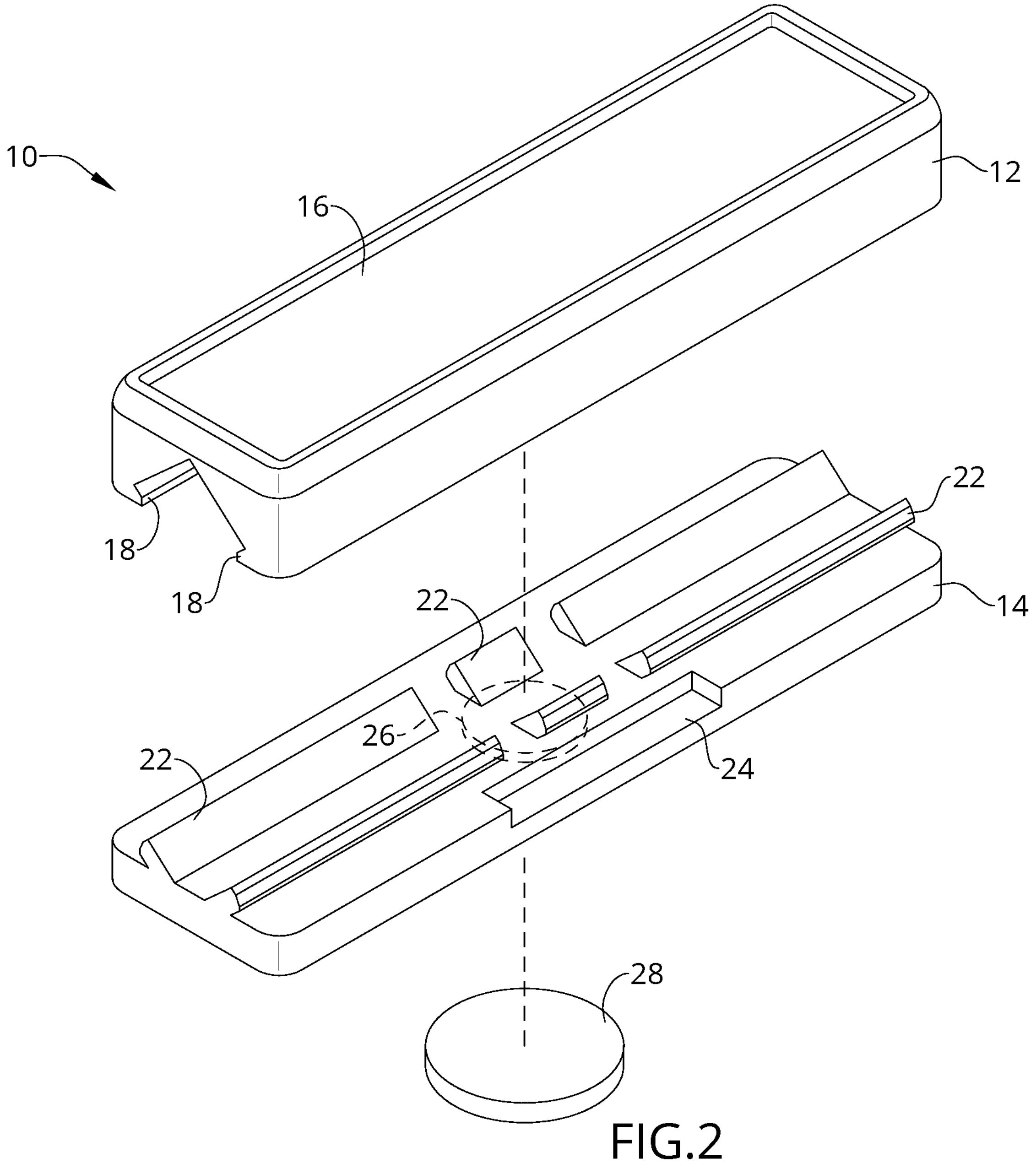
FIG. 2 shows an exploded view of one embodiment of the present invention.
Figure 3:
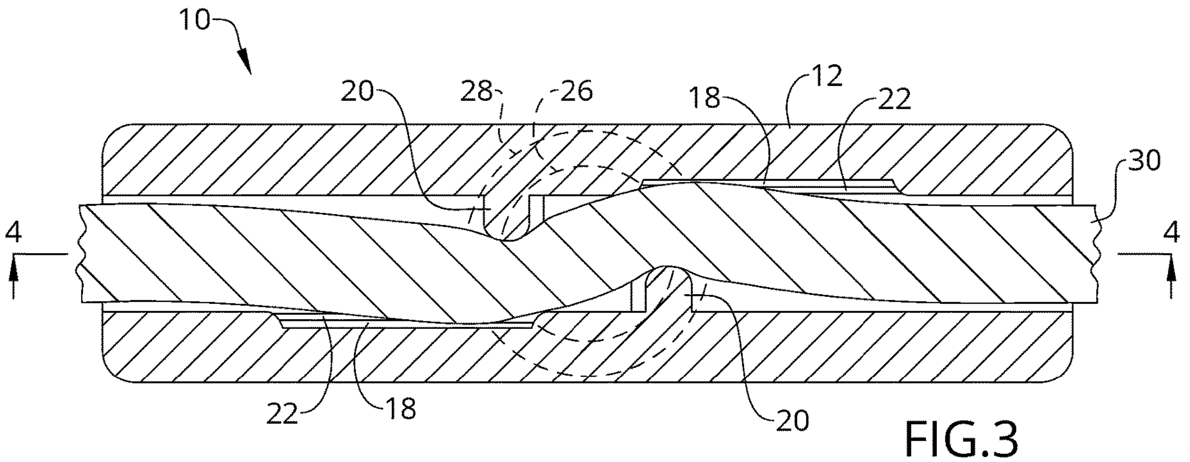
FIG. 3 shows a section view of one embodiment of the present invention taken along line 3-3 in FIG. 1.
Figure 4:
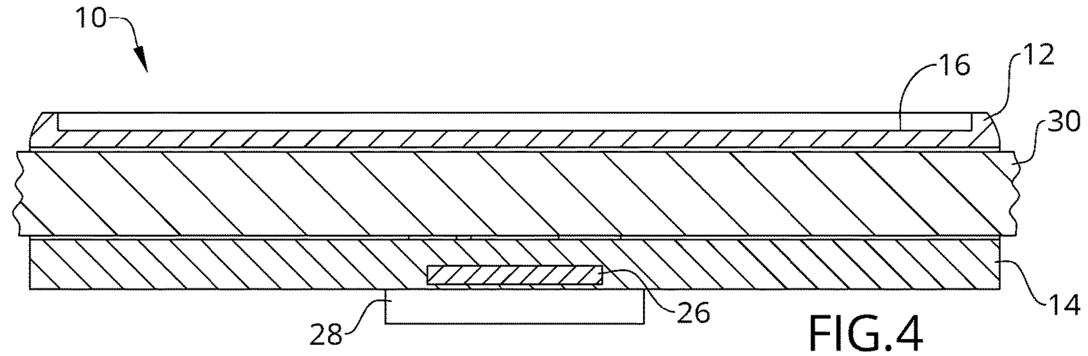
FIG. 4 shows a section view of one embodiment of the present invention taken along line 4-4 in FIG. 1.

By way of example, and referring to FIGS. 1-4, one embodiment of a wire labeling kit 10 further comprises a top body 12 joined to a bottom body 14. The top body 12 further comprises a top body top side further comprising a text field surface 16. The top body 12 further comprises a top body bottom side further comprising a notched cavity 18. The notched cavity 18 further comprises a first top protrusion 20 and a second top protrusion 20.

The bottom body 14 further comprises a plurality of bottom protrusions 22 which are configured to mate with the notched cavity 18. The bottom body 14 further comprises a bottom body top surface cutout 24, which can be used to separate the top body 12 from the bottom body 14. The bottom body 14 further comprises a bottom body cavity which houses an internal magnet 26.

The internal magnet 26 can be magnetically coupled to an external magnet 28 in order to attach the wire labeling kit to a fixed surface. A user can make the wire labeling kit on a 3D printer or with injection molding. The top body 12 and the bottom body 14 can be 3D printed independently and magnets can be embedded during the manufacturing process.

The top body 12 and the bottom body 14 are both necessary to enable the snapping together of the wire labeling kit 10. The first top protrusion 20 and a second top protrusion 20 built within the top body 12 provide resistance to cables possibly sliding through the invention. The "V" snap mechanism provides a good latch between the top body 12 and the bottom body 14 while allowing insertion of a wide variety of cables 30. The embedded magnet 26 in the bottom body 14 and the external magnet 28 can be optional and provide an attachment mechanism for a consumer to assign a home for one's cable 30.

As used in this application, the term "a" or "an" means "at least one" or "one or more."

As used in this application, the term "about" or "approximately" refers to a range of values within plus or minus 10% of the specified number.

As used in this application, the term "substantially" means that the actual value is within about 10% of the actual desired value, particularly within about 5% of the actual desired value and especially within about 1% of the actual desired value of any variable, element or limit set forth herein.

All references throughout this application, for example patent documents including issued or granted patents or equivalents, patent application publications, and non-patent literature documents or other source material, are hereby incorporated by reference herein in their entireties, as though individually incorporated by reference, to the extent each reference is at least partially not inconsistent with the disclosure in the present application (for example, a reference that is partially inconsistent is incorporated by reference except for the partially inconsistent portion of the reference).

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

Any element in a claim that does not explicitly state "means for" performing a specified function, or "step for" performing a specified function, is not to be interpreted as a "means" or "step" clause as specified in 35 U.S.C. § 112, 16. In particular, any use of "step of" in the claims is not intended to invoke the provision of 35 U.S.C. § 112, 16.

Persons of ordinary skill in the art may appreciate that numerous design configurations may be possible to enjoy the functional benefits of the inventive systems. Thus, given the wide variety of configurations and arrangements of embodiments of the present invention the scope of the invention is reflected by the breadth of the claims below rather than narrowed by the embodiments described above.

What is claimed is:

1. A wire labeling kit, configured to provide functional and ownership information for a wire; the wire labeling kit comprising:

a top body further comprising a top body top side and a top body bottom side;

a text field surface, arranged on the top body top side;

a notched cavity, formed onto the top body bottom side;

a bottom body, further comprising a plurality of bottom protrusions which mate with the notched cavity;

a bottom body cavity formed though the bottom body and houses an internal magnet;

wherein the top body is detachably coupled to the bottom body around the wire such that a wire label can be placed on the text field surface.

2. The wire labeling kit of claim 1, further comprising: a first top protrusion and a second top protrusion formed within the notched cavity.

* * * * *